United States Patent Office 3,005,362
Patented Oct. 24, 1961

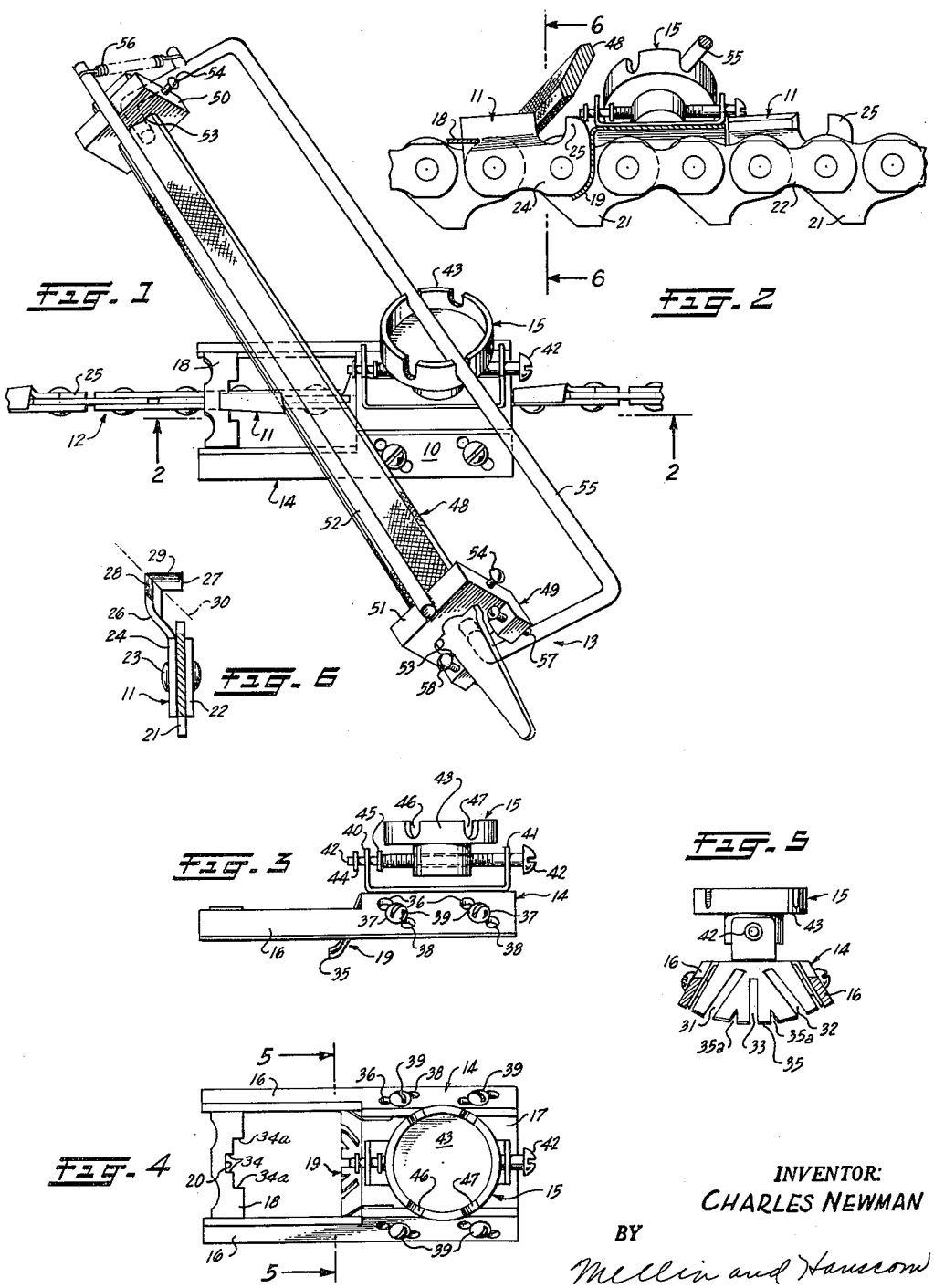

3,005,362
FIXTURE FOR SHARPENING CHAIN
SAW TEETH
Charles Newman, 433 N. Harrison, Fort Bragg, Calif.
Filed Feb. 23, 1960, Ser. No. 10,300
9 Claims. (Cl. 76—36)

This invention relates to fixture devices, and more particularly involves a fixture that may be attached to a chain saw for supporting and positioning a sharpening file relative to the cutting edges and surfaces of a saw tooth.

While many prior art fixture devices are available for positioning a file relative to the cutting face of a chain saw tooth, few devices are commercially available which are portable and can be used in the field. Moreover, of those devices that are portable, even fewer can be used by a layman with any degree of accuracy for sharpening the edges of a chisel bit saw tooth.

In brief, this invention provides a portable fixture device that may be selectively and expeditious clamped to a chain saw tooth, and whereby said fixture provides a planar supporting surface for a file. The fixture device herein described as my invention also includes: means for adjusting the file supporting surface relative to a clamping mount, thereby enabling different sizes of teeth to be acted upon; guide means for aligning a file device relative to the cutting faces of an engaged saw tooth; and means for adjustably limiting regional reciprocation of a file, thus limiting the amount of metal which is removed from a single tooth during sharpening and enabling an operator to remove a like amount of metal from each saw tooth in the chain.

It is one object of this invention to provide a fixture for sharpening chain saw teeth having a spring clip mounting and including a file supporting surface, said spring clip enabling the fixture to be expeditiously attached to a tooth of a chain saw and positioning said surface at a proper angle for shapening the tooth with a file.

A second object is to provide a fixture for sharpening chain saw teeth having a file supporting platform including spaced lateral members adjustably mounted to a support plate, whereby said lateral members provide a file supporting surface that may be adjusted vertically and laterally relative to said support plate for accommodating different sizes of saw teeth.

Another object of this invention is to provide a fixture for sharpening chain saw teeth including means for supporting the cutting edge of a sharpening file in a coplanar position relative to the line intersection between cutting faces of a chisel bit saw tooth, and having guide means for aligning the surfaces of said file in parallel relation to said cutting faces, thereby positioning said file for sharpening an engaged saw tooth.

A further object is to provide a fixture for sharpening chain saw teeth including a guide mount for a sharpening file, said guide mount being reciprocally supported relative to a saw tooth for limited movement toward and away from said tooth, whereby the movement of a sharpening file is limited in the direction normal to the cutting faces of said tooth.

Other objects of this invention will become apparent in view of the following description and the drawings.

In the drawings, forming a part of this application, and in which like parts are designated by like reference numerals throughout the same, FIG. 1 is a plan view of one embodiment of the chain saw sharpening fixture clipped onto a tooth of said chain and having a file sharpening device supported thereon;

FIG. 2 is an elevational view, partly in section and taken on line 2—2 of FIG. 1;

FIG. 3 is an elevational view of the chain saw sharpening fixture shown in FIG. 1;

FIG. 4 is a plan view of the fixture embodiment;
FIG. 5 is a vertical section taken on line 5—5 of FIG. 4; and
FIG. 6 is a vertical section of a chisel bit chain saw tooth as taken on line 6—6 of FIG. 2.

Referring to FIG. 1, a file supporting fixture, generally indicated by reference numeral 10, is mounted upon a chisel bit tooth 11 of a chain 12. The file device 13 is positioned by fixture 10 relative to the cutting faces of tooth 11 preparatory for sharpening.

This invention is more particularly concerned with the fixture device 10 which, in general, comprises a file supporting platform 14 and an angular guide mount 15 fastened thereto. Platform 14 includes a pair of spaced lateral members 16 having coplanar upper hardened surfaces that define a file support plane, said members being adjustably mounted to a support plate 17 and interconnected by a laterally notched stop member 18. A spring clip 19 depends from the support plate 17, the distance between clip 19 and the notched portion 20 of member 18 being slightly less, in the unstrained condition, than the length of tooth 11. The angular guide mount 15 is also supported upon plate 17 in a manner to be more particularly described.

Referring to FIGS. 2 and 6, conventional chain saws employ a link chain having a plurality of chain saw teeth 11 linked together but spaced at desired intervals between guide link members 21. The link members, it will be noted, are centrally located in a pivotal connection involving a tooth member 11 and a mounting link member 22, the three members being held together by a rivet 23.

The teeth of a saw chain characteristically possess a link body 24 and a depth gauge or rider 25 on the upper forward end thereof. Link body 24, which forms the working part of the tooth, comprises an upwardly extending shank 26 and a toe portion 27 that extends at an angle substantially normal thereto, cutting edges being formed on both the shank and toe portions. While some of the tooth cutting surfaces provided are continuously generated from an axis in a plane normal to the shank, as to form a C-shaped cutting edge, it is also conventional to provide inclined planar chisel cutting surfaces for the shank and the toe as in FIG. 6. The chain saw tooth shown, for example, is formed with a chisel edge cutting surface 28 on shank 26 and a surface 29 on toe 27, said surfaces meeting at a line of intersection 30, which is inclined to the axes of both the shank and the toe.

Non-uniformity of cutting angles for teeth of the same chain may tend to produce a lateral pulling action upon the saw and a consequential unevenness in cutting. Therefore, when sharpening the teeth in a chain, it is important to maintain uniform cutting angles and surfaces for all teeth, including right and left-hand members. The fixture embodiment shown in the drawings is adapted for attachment to and use with both the right and left-hand members of conventional C-shape and chisel edged teeth.

Individual teeth of a chain are insertable between stop member 18 and clip 19, said teeth being positioned relative to lateral members 16 and guide mount 15 with the trailing end of a shank member engaging stop member 18 and the leading edge of depth gauge 25 engaging clip 19. In order to align and hold a tooth in a position relative to the upper surface plane of members 16, three slots are provided in clip 19 for receiving a portion of a guide wing therethrough. Since the teeth in a chain are laterally rigid with their connecting guide wing, the insertion of a guide wing into one of these slots will positively orient the plane of the adjacent tooth shank relative to the platform. And where a chisel bit type tooth is to be sharpened, it is desirable to support the tooth upon an angle such that the interior line of intersection between the cutting faces and the exterior line between toe and shank are in a plane parallel to the support plane of members 16. To create such an angular orientation two angular slots 31 and 32 are provided, one slot for the right-hand member and the other for the left. Since C-shape teeth are generally cut upon axes which are in a plane substantially normal to the shank of the tooth, proper orientation is obtained for both right and left-hand teeth members with a center slot 33 which is in a plane perpendicular to the file supporting plane of members 16.

Each tooth is partly restrained from movement from the determined plane of alignment by its engagement with stop member 18. As previously indicated, member 18 is centrally notched, forming a slot 20 that engages the trailing end of a tooth shank. Slot 20 is centrally located with respect to clip 19 and its lateral dimension is controlled to provide stopping surfaces 34 for engaging a longitudinal portion of the tooth shank on one side of the slot and the rounded top peripheral edge of mounting link member 22 on the other side. Portions of member 18 are relieved at points 34a to avoid obstruction and contact with the side of mounting link 22 and its rivet, as shown in FIG. 1. In addition, it will be noted, clip 19 is bent upwardly along its peripheral depending edge 35, thereby providing a resilient supporting lip which engages the bottom front edges of tooth link body 24 and mounting link 22. These latter two contacts tend to urge the tooth forwardly and upwardly against the tooth engaging contacts of slot 20. Thus, once a tooth is positioned between stop member 18 and clip 19 all tooth movement relative to platform 14 is effectively inhibited. V-shaped notches 35a are provided along the peripheral edge 35 to enhance bending and forming of the clip 19 into a somewhat dished contour from a planar sheet of spring steel. The arms of each V-shaped notch are individually bent toward slot 20. This construction will direct the spring force of the clip perpendicularly against the leading edges of tooth link body 24 and mounting link 22.

Pairs of spaced holes 36, 37 and 38 are provided on diagonal lines in lateral members 16, and correspondingly spaced holes are provided in support plate 17. The parts are then selectively assembled by mating one pair of holes (36, 37 or 38) in members 16 with the holes in plate 17 and by fastening together with cap screws 39 and speed nuts, or some other suitable fastening means. This arrangement of structures permits an adjustment in spacing between clip 19 and notched stop member 18 to accommodate teeth of three different lengths. Since the depth of teeth are characteristically greater for longer tooth members, it is also necessary to change the elevation of the file support plane relative to the clip mounting. Accordingly, holes 36, 37 and 38 are provided on diagonal lines, adjusting for both the length of tooth and the file support plane-fixture mounting relationship.

Guide mount 15 is provided to set the sharpening file at the proper angular incline in the established plane of file support (as provided by spaced members 16). The guide mount is comprised of support bearings 40 and 41 mounted upon plate 17, a centrally threaded rod 42 reciprocally mounted upon said bearings, and a guide member 43 having a threaded opening for receiving said rod therethrough and being supported thereon. The axis of support provided by bearings 40 and 41 extends longitudinally of the tooth to which the fixture is mounted. Therefore, rod 42 can be moved toward and away from a retained tooth member during the sharpening operation. The axial movement of the rod (and thus the guide member 43) is, however, limited by small collar members 44 and 45, which are rigidly connected to rod 42 on either side of bearing 40. Guide member 43, however, can be adjusted relative to plate 17 by manually rotating rod 42. Altogether, the structural details between guide member 43, rod 42 and bearings 40 and 41 provide means for adjustably limiting regional reciprocation of the guide member.

Guide member 43 is provided with diagonal grooves 46 and 47 for receiving a slide rod of file device 13, said grooves being alternatively used, depending on whether a right or left-hand tooth member is being sharpened. Each of the diagonal grooves acts as a slide bearing which cooperates with the upper surfaces of members 16 to accurately position the file device for sharpening a tooth member. The angular incline of the grooves, relative to the longitudinal axis of a tooth member, is approximately 45°, or the conventional lip angle for the tooth shank cutting edge.

File device 13 is generally comprised of a file 48 and a file holder 49, said holder including file-holding blocks 50 and 51 interconnected by a bridge member 52 and having file-receiving openings 53 that are axially aligned. The file 48 is retained in the openings 53 by means of set screws 54. It will be noted that while an angular hexagonal file is used for sharpening a chisel bit tooth, a round file would be substituted where a C-shaped tooth is to be sharpened. For this reason the slot openings 53 are shaped for receiving both types of files.

The file holder also carries a guide bar or rod 55 that pivotally engages blocks 50 and 51, said bar being held radially outward from the file 48 but parallel thereto. Spring means 56 is provided for biasing the guide bar into one of two positions, either against adjustable stop 57 or adjustable stop 58, said stops extending from block 51 on either side of the rod. The distance between rod 55 and the hexagonal file is determined by the vertical distance between the slide bearing surface of guide member 43 and the file support plane of members 16. Accordingly, with proper proportioning of these distances the angle of incline for the file 48 is established, insuring a proper angular relationship between the edges of the file and the line of intersection between the cutting surfaces of a chisel bit tooth.

In the use of the file device 13 it is first determined whether a left or right-hand saw tooth is to be filed. Depending on which type of tooth is to be sharpened, the guide rod 55 is placed into engagement with that stop member which allows the file to be placed upon the supporting surface of members 16 while the guide bar engages the respective bearing surface of guide member 43.

The manner of connecting a saw tooth to fixture 10 is substantially as follows:

Slot 20 of stop member 18 is initially placed over the trailing end of the selected saw tooth. The clip 19 is then moved downwardly in back of the depth gauge portion of the tooth, springing the clip outwardly and aligning the adjacent guide wing with the proper receiving slot. As peripheral edge 35 of clip 19 clears the rounded bottom front edges of tooth link body 24 and mounting link 22, the resilient tension in the clip moves inwardly, forcing the tooth upwardly and forwardly against the tooth-engaging contacts of slot 20. Having thus positioned platform 14 relative to the tooth member, all angular relationships between tooth, guide mount and file support surfaces are automatically established. The file device 13 is then placed upon fixture 10, file 48 being supported upon members 16, and guide bar 55 being supported in the proper guide groove of member 43. The distance between the filing surfaces of file 48 and the tooth cutting surfaces will depend upon the relative position of guide member 43 upon screw rod 42 and also the relative position of rod 42 upon its mounting, reciprocation thereof being limited by collar members 44 and 45. Through proper rotative adjustment of rod 42, the filing device 13 can be allowed to advance the same predetermined distance for each tooth in a chain. Accordingly, each tooth in the chain will be similarly sharpened with an equivalent amount of metal being removed in the sharpening process.

While a preferred form of the invention is herewith shown and described, it is to be understood that various changes in the shape, size and arrangement of parts may be made without departing from the spirit of this invention or the scope of the attached claims, and each of such changes is contemplated.

Having thus described my invention what I claim and desire to secure by Letters Patent is:

1. A fixture for supporting and aligning a file relative to a chain saw tooth, said device comprising: a file supporting platform having file supporting surfaces, a stop member mounted from said platform and adapted for engaging the trailing edge of a chain saw tooth, and a spring clip vertically mounted from said platform and being laterally resilient for engaging the leading edge of the depth gauge portion of a chain saw tooth, said clip having an elongated slot therein for straddling a guide wing portion of a saw chain, said slot having a width only slightly greater than the width of the guide wing; whereby said file platform may be rigidly mounted relative to a chain saw tooth, thereby positioning said file supporting surfaces relative to the cutting edges and faces of a saw tooth for proper sharpening.

2. A fixture for supporting and aligning a file relative to a chain saw tooth, said device comprising: a file platform having spaced lateral members adjustably mounted to a support plate at one end and interconnected by a laterally notched stop member at the other end, said spaced members providing surfaces that define a plane for supporting a sharpening file, whereby said members may be adjusted vertically and laterally relative to said support plate for different sizes of saw teeth and whereby the notched portion of said stop member is adapted for engaging the trailing edge of a chain saw tooth, a spring clip vertically mounted from said support plate and being laterally resilient for engaging the leading edge of the depth gauge portion of a chain saw tooth; whereby said file platform may be rigidly mounted relative to a chain saw tooth, thereby positioning said spaced members and supporting a file relative to the cutting edges and faces of a saw tooth for proper sharpening.

3. A fixture for supporting and aligning a file relative to a chain saw tooth, said device comprising: a file platform having spaced lateral members mounted to a support plate at one end and interconnected by a laterally notched stop member at the other end, said spaced members providing surfaces that define a plane for supporting a sharpening file, the notched portion of said stop member being adapted for engaging the trailing edge of a chain saw tooth, and a spring clip vertically mounted from said support plate and being laterally resilient for engaging the leading edge of the depth gauge portion of a chain saw tooth, said clip having an elongated slot therein for straddling a guide wing portion of a saw chain, said slot having a width only slightly greater than the width of the guide wing; whereby said file platform may be rigidly mounted relative to a chain saw tooth, thereby positioning said spaced members and supporting a file relative to the cutting edges and faces of a saw tooth for proper sharpening.

4. A fixture for supporting and aligning a file relative to a chain saw tooth, said device comprising: a file platform having spaced lateral members mounted to a support plate at one end and interconnected by a laterally notched stop member at the other end, said spaced members providing surfaces that define a plane for supporting a sharpening file, the notched portion of said stop member being adapted for engaging the trailing edge of a chain saw tooth, and a spring clip vertically mounted from said support plate and being laterally resilient for engaging the leading edge of the depth gauge portion of a chain saw tooth, said clip having a slot therein for receiving a guide wing portion of a saw chain, said slot being angularly elongated with respect to said support plane for positioning a retained saw tooth at the proper angle for sharpening with a file; whereby said file platform may be rigidly mounted relative to a chain saw tooth, thereby positioning said spaced members and supporting a file relative to the cutting edges and faces of a saw tooth for proper sharpening.

5. A fixture for supporting and aligning a file relative to a chain saw tooth, said device comprising: a file platform having spaced lateral members mounted to a support plate at one end interconnected by a laterally notched stop member at the other end, said spaced members providing surfaces that define a plane for supporting a sharpening file, the notched portion of said stop member being adapted for engaging the trailing edge of a chain saw tooth, and a spring clip vertically mounted from said support plate and being laterally resilient for engaging the leading edge of the depth gauge portion of a chain saw tooth, said clip having slots therein for receiving respective guide wing portions of a saw chain, each of said slots being angularly elongated with respect to said support plane for positioning respective left and right saw teeth of a chain at the proper angle for sharpening with a file; whereby said file platform may be rigidly mounted relative to a chain saw tooth, thereby positioning said spaced members and supporting a file relative to the cutting edges and faces of a saw tooth for proper sharpening.

6. A fixture for supporting and aligning a file relative to a chain saw tooth, said device comprising: a file supporting platform, means for rigidly mounting said platform relative to a chain saw tooth; spaced bearing mounts supported upon said platform and having an axis extending longitudinally of an engaged saw tooth, a centrally threaded rod reciprocally supported upon said spaced bearings, a file supporting guide having a threaded opening for receiving said rod therethrough and being supported thereon, said guide providing a guide surface angularly formed relative to the longitudinal axis of an engaged saw tooth and having an angular incline corresponding to the lateral rake angle complement of a saw tooth for which it is adapted, and means for limiting reciprocal movement of said rod upon said bearings; whereby a filing device can be rested upon said file supporting guide and moved into angularly controlled relation with a chain saw tooth.

7. A fixture for supporting and aligning a file relative to a chain saw tooth, said device comprising: a file platform having spaced members defining a file support plane; means for rigidly mounting said platform relative to a chain saw tooth, thereby angularly positioning the support plane of said spaced members relative to the cutting edges of the saw tooth; spaced bearing mounts supported upon said platform and having an axis extending longitudinally of an engaged saw tooth, a centrally threaded rod reciprocally supported upon said spaced bearings, an angle guide having a threaded opening for receiving said rod therethrough and being supported thereon, said guide providing a guide surface angularly formed relative to the longitudinal axis of an engaged saw tooth and having an angular incline corresponding to the lateral rake angle complement of a saw tooth for which it is adapted, and means for limiting reciprocal movement of said rod upon said bearings; whereby a filing device can be rested upon said support surface, engaged with said angle guide and moved into angularly controlled relation with a chain saw tooth, the filing surfaces of said filing device engaging flush with corresponding surfaces of said tooth.

8. A fixture for supporting and aligning a file relative to a chain saw tooth, said device comprising: a file platform having spaced lateral members mounted to a support plate at one end and interconnected by a laterally notched stop member at the other end, said spaced members providing surfaces that define a plane for supporting a sharpening file, the notched portion of said stop member being adapted for engaging the trailing edge of a chain saw tooth, a spring clip vertically mounted from said support plate and being laterally resilient for engaging the leading edge of the depth gauge portion of a chain saw tooth, spaced bearing mounts supported upon said support plate and having an axis extending longitudinally of an engaged saw tooth, a centrally threaded rod reciprocally supported upon said spaced bearings, an angle guide having a threaded opening for receiving said rod therethrough and being supported thereon, said guide providing a guide surface angularly formed relative to the longitudinal axis of an engaged saw tooth and having an angular incline corresponding to the lateral rake angle complement of a saw tooth for which it is adapted, and means for limiting reciprocal movement of said rod upon said bearings; whereby a filing device can be rested upon said support surface, engaged with said angle guide and moved into angularly controlled relation with a chain saw tooth, the filing surfaces of said filing device engaging flush with corresponding surfaces of said tooth.

9. A fixture for supporting and aligning a file relative to a chain saw tooth, said device comprising: a file supporting platform, means for rigidly mounting said platform relative to a chain saw tooth, a rod member having a threaded portion thereon, means for reciprocally and rotatably mounting said rod member from said platform upon an axis extending longitudinally of an engaged saw tooth, a file supporting guide threadedly mounted upon the threaded portion of said rod, said guide providing a guide surface angularly formed relative to the longitudinal axis of an engaged saw tooth and having an angular incline corresponding to the lateral rake angle complement of a saw tooth for which it is adapted, and means for limiting reciprocal movement of said rod upon said platform; whereby a filing device can be rested upon said file supporting guide and moved into angularly controlled relation with a chain saw tooth.

References Cited in the file of this patent

UNITED STATES PATENTS

| | | |
|---|---|---|
| 657,850 | Bartlett | Sept. 11, 1900 |
| 661,902 | Bartlett | Nov. 13, 1900 |
| 699,206 | Miller | May 6, 1902 |
| 2,677,289 | Fitch | May 4, 1954 |
| 2,737,830 | Siverson | Mar. 13, 1956 |
| 2,813,438 | Paradis | Nov. 19, 1957 |
| 2,898,782 | Consoletti | Aug. 11, 1959 |